(12) United States Patent
Raffaelli

(10) Patent No.: US 10,501,118 B2
(45) Date of Patent: Dec. 10, 2019

(54) FORECARRIAGE OF TILTING MOTOR VEHICLE AND MOTOR VEHICLE THEREOF

(71) Applicant: PIAGGIO & C. S.p.A., Pontedera, Pisa (IT)

(72) Inventor: Andrea Raffaelli, Pisa (IT)

(73) Assignee: PIAGGIO & C. S.p.A., Pontedera, Pisa (IT)

(*) Notice: Subject to any disclaimer, the term of this patent is extended or adjusted under 35 U.S.C. 154(b) by 58 days.

(21) Appl. No.: 15/749,688

(22) PCT Filed: Aug. 3, 2016

(86) PCT No.: PCT/IB2016/054682
§ 371 (c)(1),
(2) Date: Feb. 1, 2018

(87) PCT Pub. No.: WO2017/021905
PCT Pub. Date: Feb. 9, 2017

(65) Prior Publication Data
US 2018/0222527 A1   Aug. 9, 2018

(30) Foreign Application Priority Data

Aug. 3, 2015 (IT) .................. 102015000041334

(51) Int. Cl.
*B62D 9/02*    (2006.01)
*B62K 5/08*    (2006.01)
(Continued)

(52) U.S. Cl.
CPC ............... *B62D 9/02* (2013.01); *B62D 9/04* (2013.01); *B62K 5/01* (2013.01); *B62K 5/027* (2013.01);
(Continued)

(58) Field of Classification Search
CPC .............. B62D 9/02; B62K 5/10; B62K 5/08
See application file for complete search history.

(56) References Cited

U.S. PATENT DOCUMENTS 4,550,926 A * 11/1985 MacIsaac ................ B60G 3/18
280/124.103
4,887,829 A * 12/1989 Prince .................... B60G 21/05
280/282

(Continued)

FOREIGN PATENT DOCUMENTS

EP         3144164 A1 *  3/2017  ............. B62K 25/16
JP    2016175438 A  * 10/2016  ............... B62D 9/02
(Continued)

*Primary Examiner* — Nicole T Verley
(74) *Attorney, Agent, or Firm* — Arent Fox LLP; Michael Fainberg

(57) ABSTRACT

A motor vehicle forecarriage comprises a forecarriage frame, a pair of front wheels kinematically connected to the forecarriage frame by means of an articulated quadrilateral, said articulated quadrilateral comprising a pair of cross members, hinged to the forecarriage frame in correspondence of middle hinges, said cross members being connected together, at opposite transversal ends by uprights pivoted at said transversal ends at side hinges, each upright extending from an upper end and a lower end, the upper end facing the upper cross member and the lower end facing the lower cross member the cross members and the uprights defining said articulated quadrilateral. Advantageously the forecarriage comprises, in correspondence of each front wheel, a tilting support structure for a stub axle of each front wheel mechanically connected to a rotation pin of a front wheel so as to rotatably support the front wheel around a related rotation axis.

33 Claims, 13 Drawing Sheets

(51) Int. Cl.
*B62K 5/01* (2013.01)
*B62K 5/027* (2013.01)
*B62K 5/10* (2013.01)
*H02S 50/10* (2014.01)
*G06Q 10/04* (2012.01)
*G06Q 10/06* (2012.01)
*G06Q 50/06* (2012.01)
*B62D 9/04* (2006.01)
*B62K 5/00* (2013.01)

(52) U.S. Cl.
CPC .............. *B62K 5/08* (2013.01); *B62K 5/10* (2013.01); *G06Q 10/04* (2013.01); *G06Q 10/0639* (2013.01); *G06Q 50/06* (2013.01); *H02S 50/10* (2014.12); *B62K 2005/001* (2013.01)

(56) References Cited

U.S. PATENT DOCUMENTS

| | | | | |
|---|---|---|---|---|
| 5,762,351 | A * | 6/1998 | SooHoo | B60G 21/007 |
| | | | | 180/210 |
| 7,377,522 | B2 * | 5/2008 | MacIsaac | B60G 3/01 |
| | | | | 280/5.506 |
| 7,467,802 | B2 * | 12/2008 | Peng | B60G 21/007 |
| | | | | 280/124.103 |
| 7,487,985 | B1 * | 2/2009 | Mighell | B62K 5/027 |
| | | | | 180/210 |
| 7,568,541 | B2 * | 8/2009 | Pfeil | B60G 21/007 |
| | | | | 180/210 |
| 7,571,787 | B2 * | 8/2009 | Saiki | B60G 7/00 |
| | | | | 180/210 |
| 7,850,180 | B2 * | 12/2010 | Wilcox | B60G 7/008 |
| | | | | 180/210 |
| 8,123,240 | B2 * | 2/2012 | Mercier | B62D 9/02 |
| | | | | 280/124.103 |
| 8,419,027 | B2 * | 4/2013 | Ting | B62K 5/02 |
| | | | | 280/124.103 |
| 8,814,186 | B1 * | 8/2014 | Rinda | B62K 5/06 |
| | | | | 280/93.504 |
| 8,818,700 | B2 * | 8/2014 | Moulene | G05D 1/0891 |
| | | | | 180/199 |
| 9,037,347 | B2 * | 5/2015 | Hayashi | B60G 17/015 |
| | | | | 313/146 |
| 9,216,790 | B2 * | 12/2015 | Takano | B60G 17/005 |
| 9,296,420 | B2 * | 3/2016 | Sasaki | B62J 15/00 |
| 9,340,249 | B2 * | 5/2016 | Takano | B62K 21/00 |
| 9,387,902 | B2 * | 7/2016 | Kroening, Jr. | B62K 13/04 |
| 9,527,543 | B2 * | 12/2016 | Mercier | B62K 5/05 |
| 9,545,967 | B2 * | 1/2017 | Takano | B62K 21/00 |
| 9,586,642 | B2 * | 3/2017 | Mori | B62K 5/10 |
| 9,688,339 | B2 * | 6/2017 | Hirayama | B62K 5/05 |
| 9,725,130 | B2 * | 8/2017 | Takano | B62K 5/05 |
| 9,776,680 | B2 * | 10/2017 | Hirakawa | B62K 5/05 |
| 9,855,807 | B2 * | 1/2018 | Mori | B60G 3/26 |
| 9,981,708 | B2 * | 5/2018 | Ohno | B62K 5/027 |
| 2004/0140645 | A1 * | 7/2004 | Hayashi | B62K 5/05 |
| | | | | 280/282 |
| 2006/0151232 | A1 * | 7/2006 | Marcacci | B60G 21/007 |
| | | | | 180/414 |
| 2007/0029751 | A1 * | 2/2007 | Marcacci | B62D 9/02 |
| | | | | 280/124.1 |
| 2011/0275256 | A1 * | 11/2011 | Gibbs | B60F 3/0007 |
| | | | | 440/12.51 |
| 2012/0181768 | A1 * | 7/2012 | MacIsaac | B60G 3/01 |
| | | | | 280/124.103 |
| 2013/0161919 | A1 | 6/2013 | Gaillard-Groleas | |
| 2013/0168944 | A1 | 7/2013 | Bartolozzi et al. | |
| 2015/0197304 | A1 * | 7/2015 | Kroening, Jr. | B62K 13/04 |
| | | | | 180/209 |
| 2018/0222527 | A1 * | 8/2018 | Raffaelli | B62D 9/02 |
| 2018/0237094 | A1 * | 8/2018 | Fischer | B62K 5/06 |
| 2018/0265156 | A1 * | 9/2018 | Hara | B62D 5/046 |
| 2018/0327044 | A1 * | 11/2018 | Raffaelli | B62K 5/06 |

FOREIGN PATENT DOCUMENTS

| | | |
|---|---|---|
| WO | 2009/061158 A2 | 5/2009 |
| WO | 2015/067760 A1 | 5/2015 |
| WO | WO-2019060966 A1 * | 4/2019 ............. B60G 3/01 |

* cited by examiner

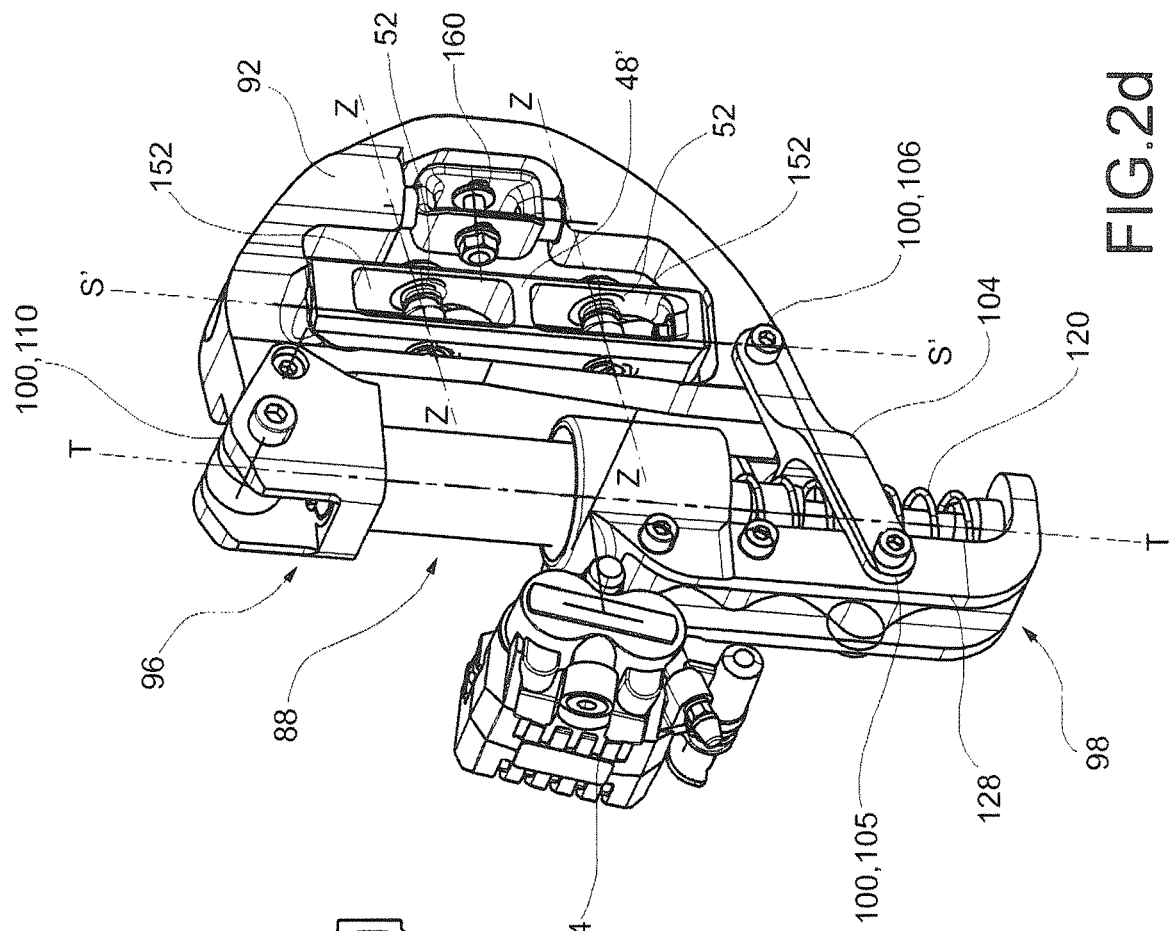
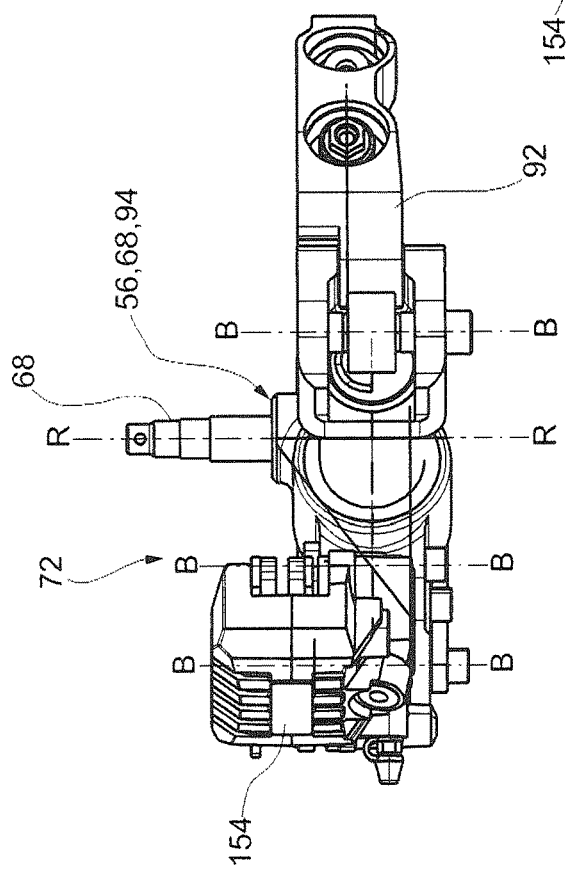
FIG.2d
FIG.2c

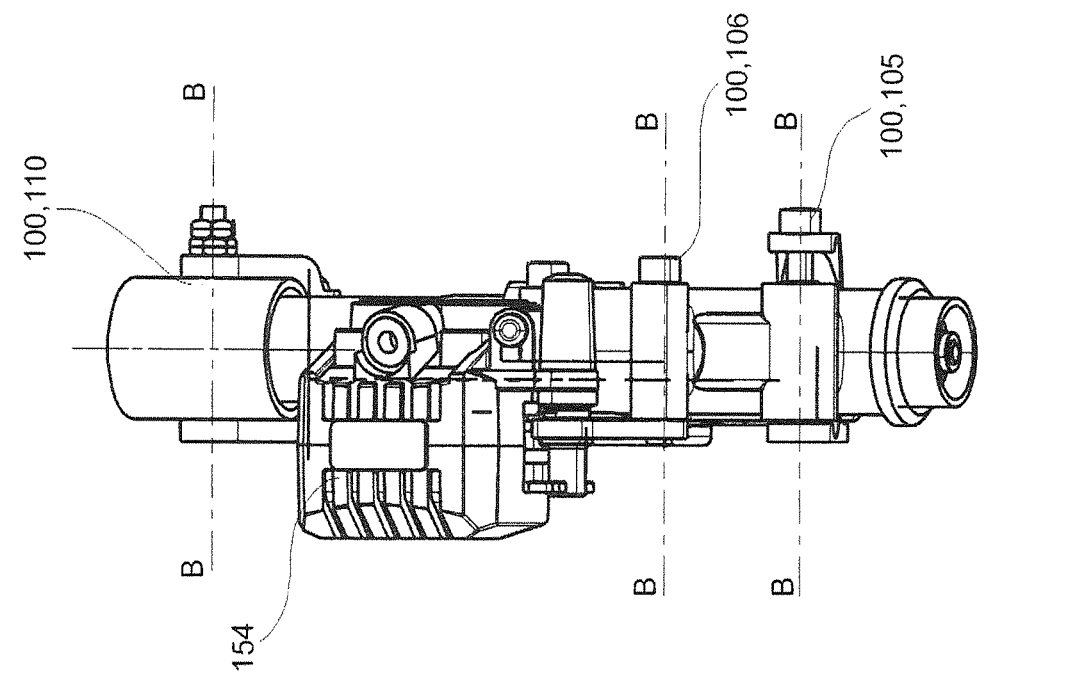
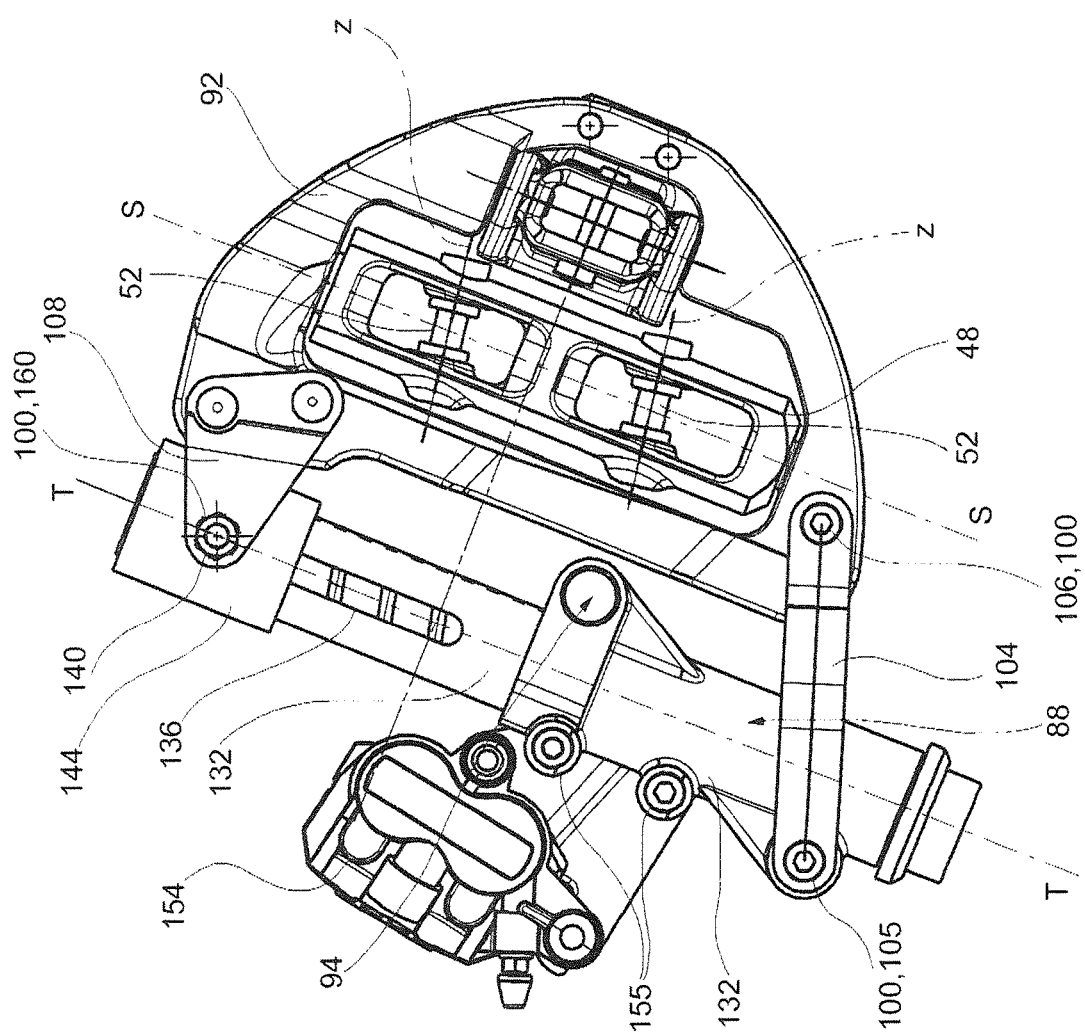
FIG.4b
FIG.4a

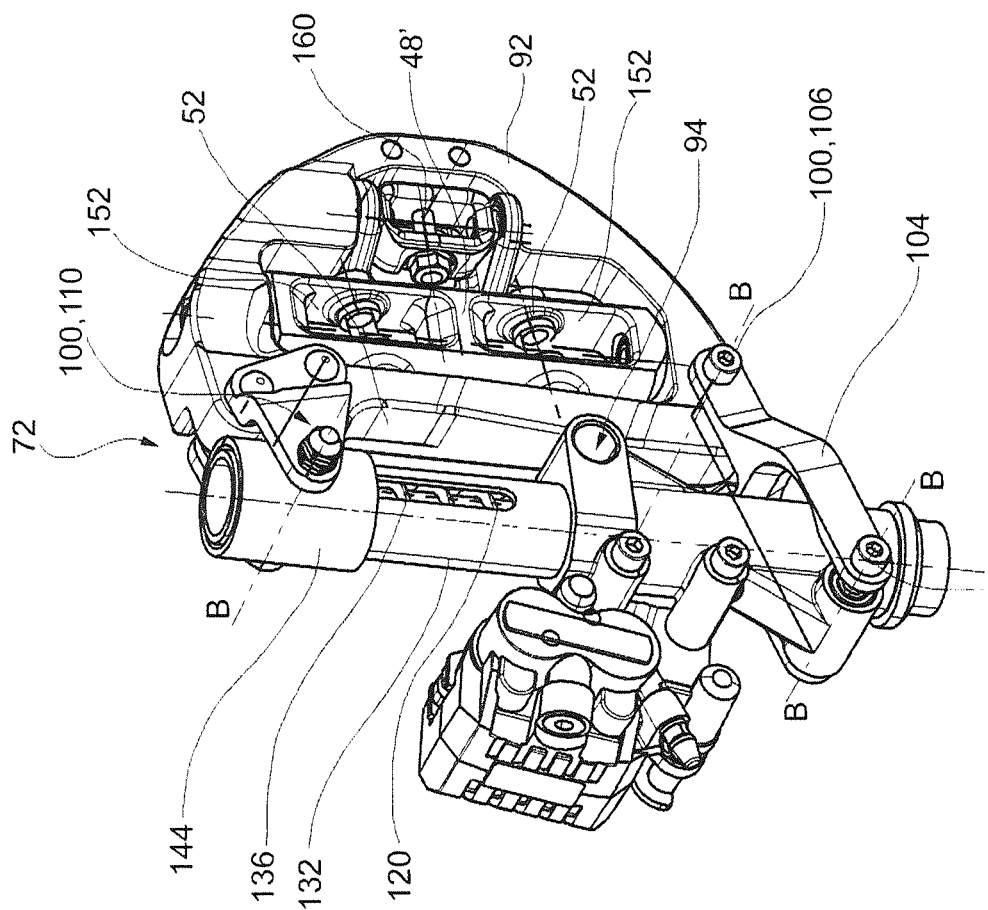
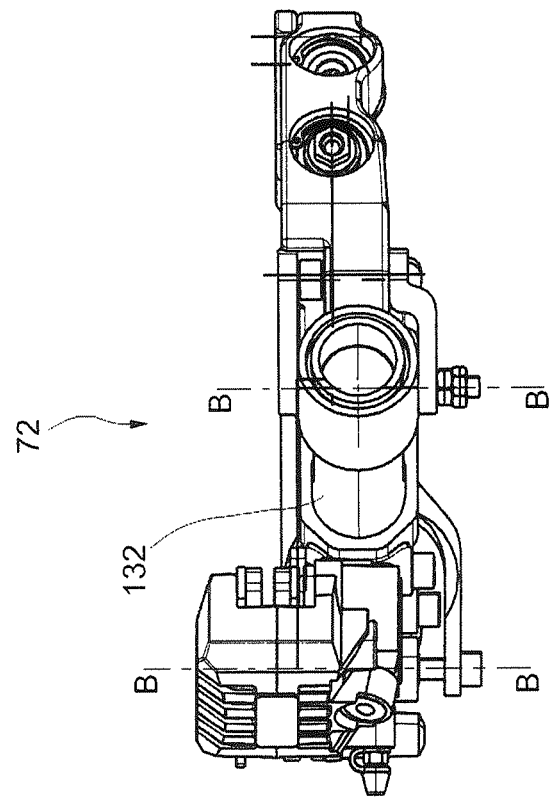
FIG.4d
FIG.4c

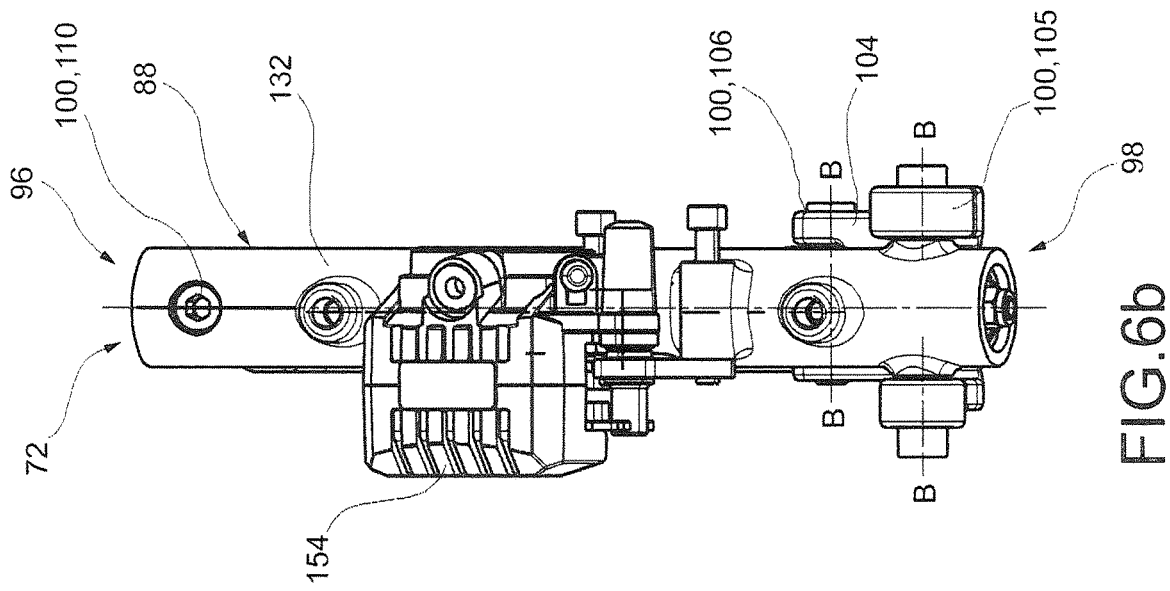
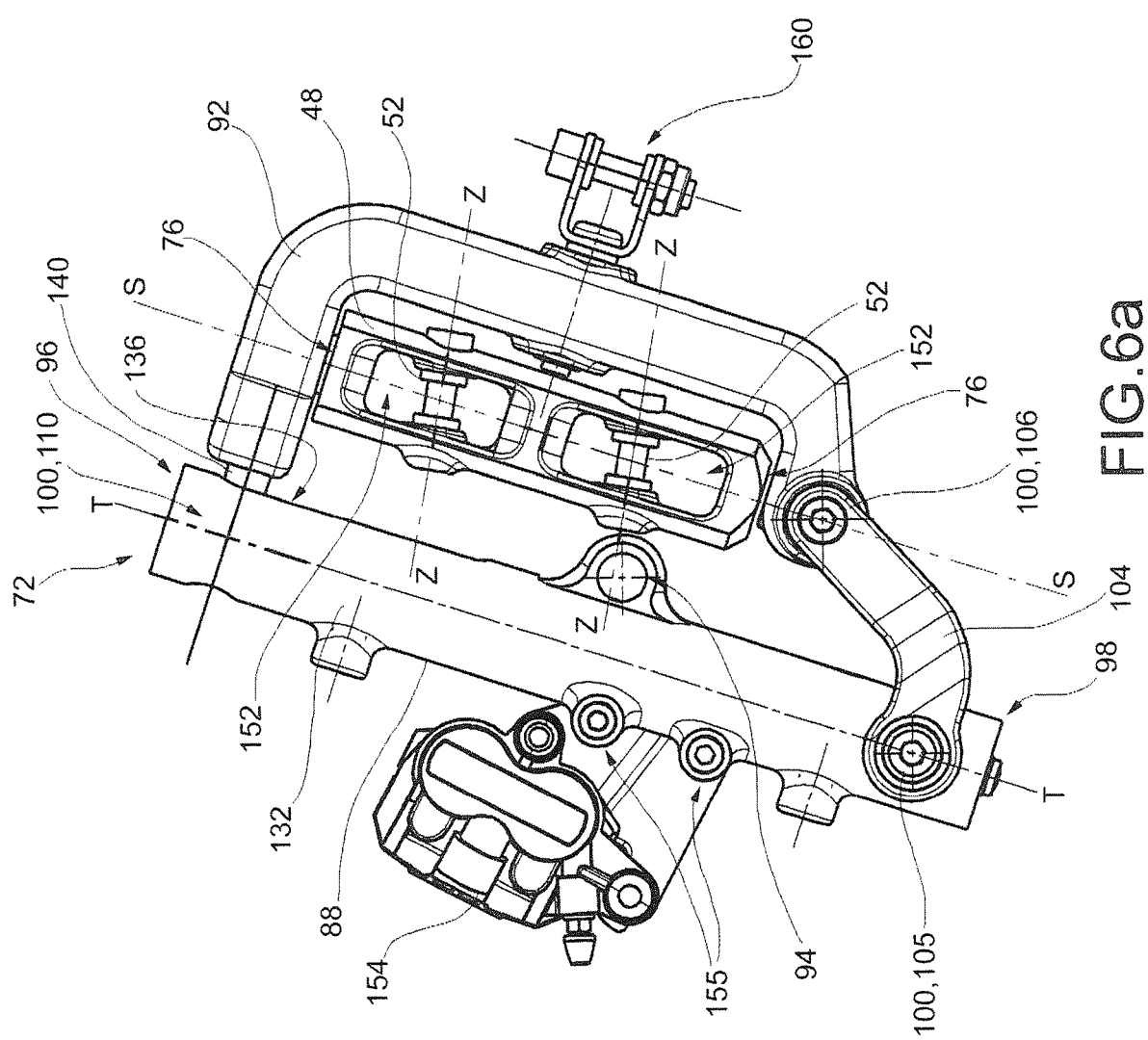

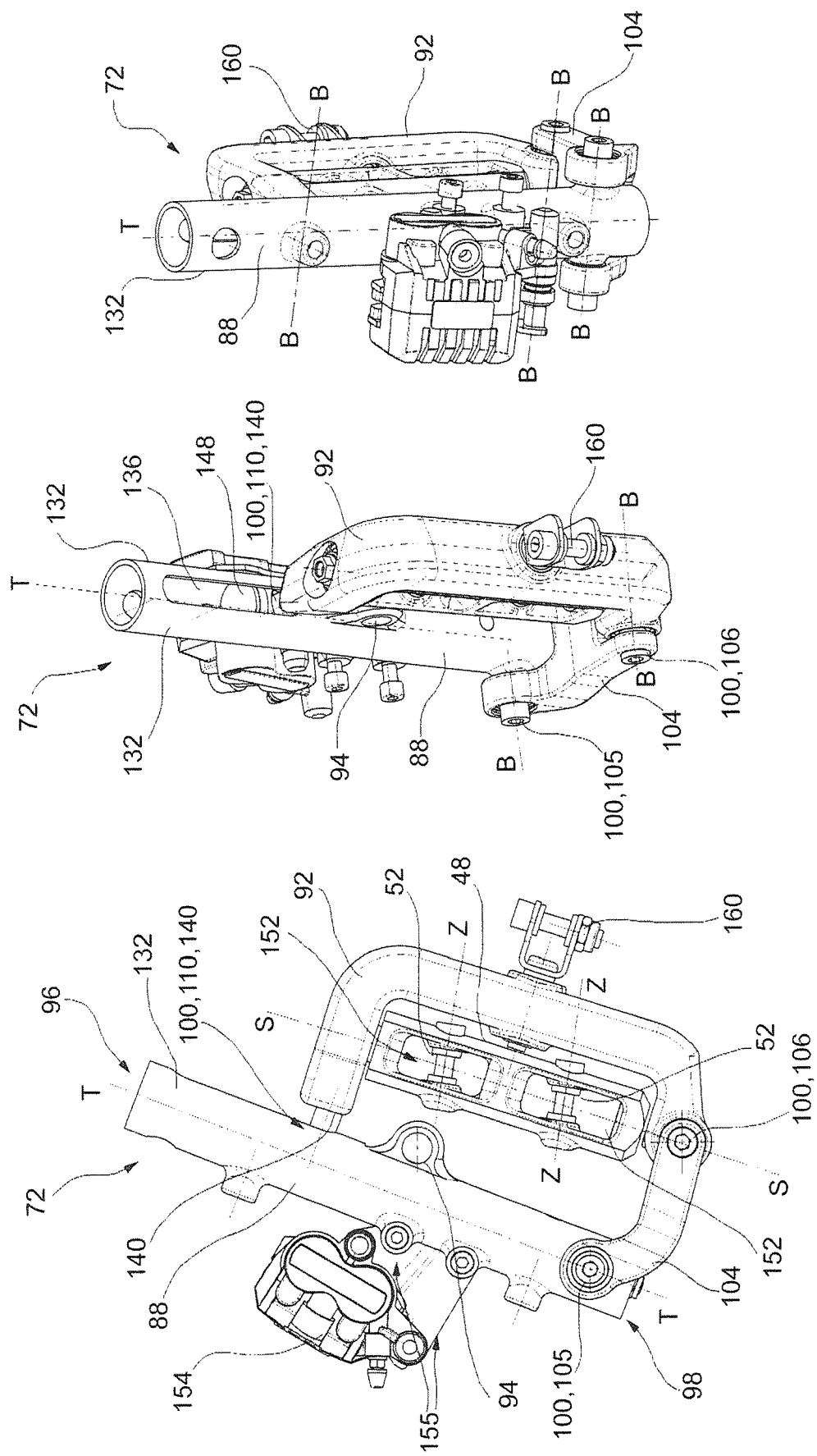

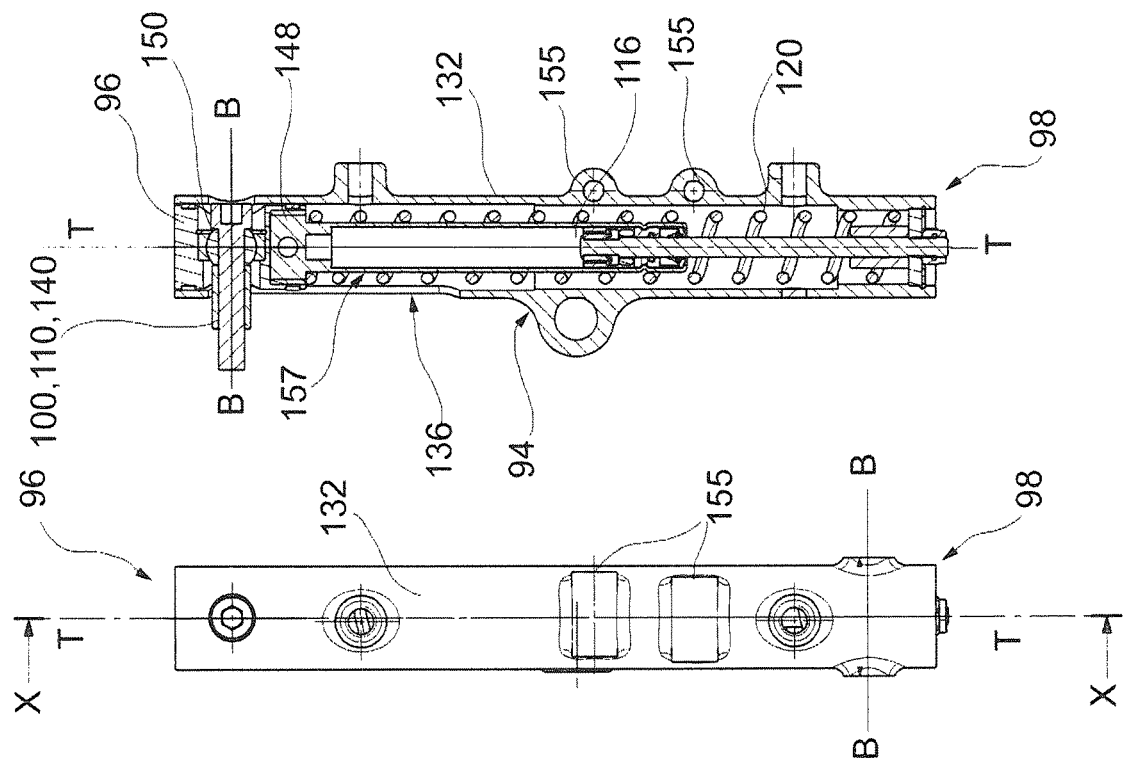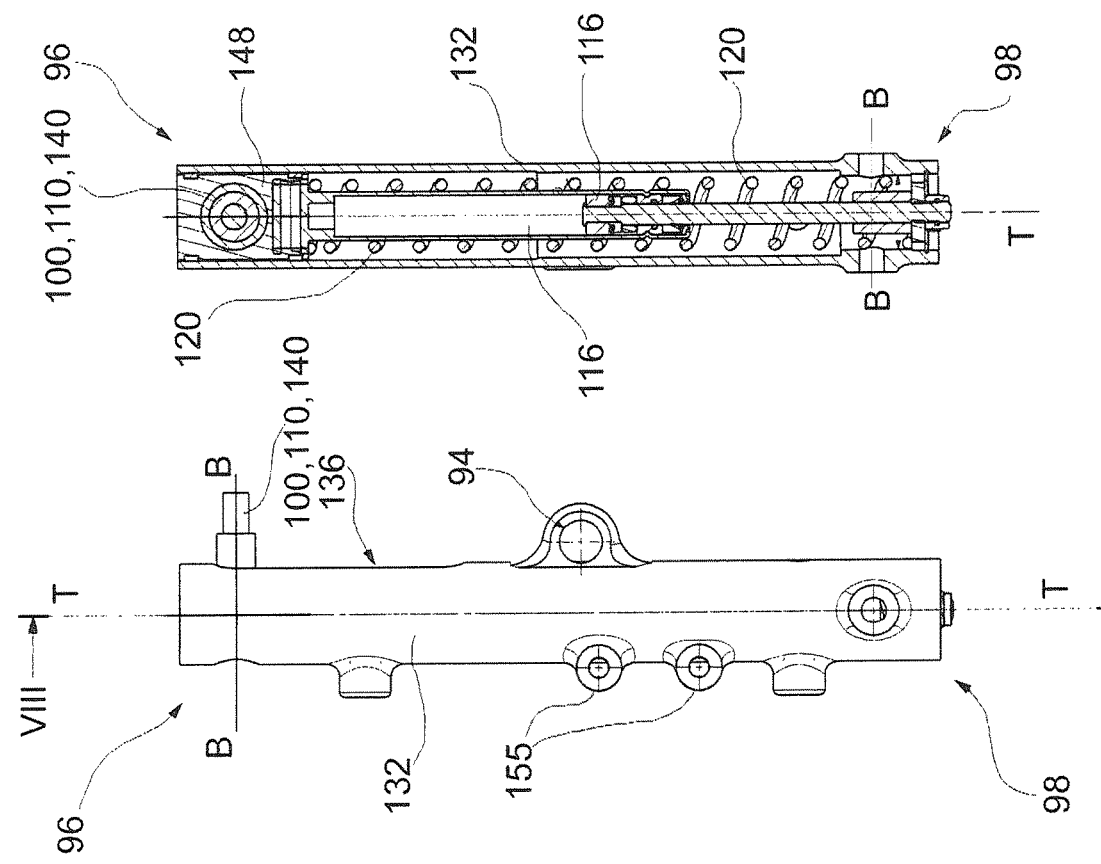

FORECARRIAGE OF TILTING MOTOR VEHICLE AND MOTOR VEHICLE THEREOF

CROSS-REFERENCE TO RELATED APPLICATIONS

This application is the U.S. National Stage Application of International Patent Application No. PCT/IB2016/054682, filed on Aug. 3, 2016, which claims priority to Italian Patent Application No. 102015000041334, filed on Aug. 3, 2015, the contents of each of which is incorporated herein by reference in its entirety.

FIELD OF APPLICATION

The present invention relates to a forecarriage of a tilting motor vehicle and a motor vehicle thereof.

STATE OF THE ART

As is known, three-wheeled motor vehicles exist in the art with a rear drive wheel and two steering and tilting wheels. i.e. rolling or inclining, at the front.

Therefore, the rear wheel is intended to provide torque and thus allow traction while the front wheels, paired, are intended to provide the directionality of the vehicle.

Using two front wheels, instead of two rear wheels, avoids the use of a differential for torque transmission. This way a reduction of costs and weights at the rear axle can be achieved.

The paired wheels at the forecarriage in addition to steering, can tilt and roll: this way, compared with the three-wheeled vehicles with two wheels at the rear axle, vehicles with two wheels at the forecarriage are equivalent to an actual motorbike since, just like a motorbike, the vehicle is able to tilt when cornering.

Compared to a motor vehicle with only two-wheels, such vehicles with two paired wheels on the forecarriage have however a greater stability ensured by the dual resting on the ground of the front wheels, similar to that provided by a car.

The front wheels are kinematically connected to each other by means of kinematic mechanisms which enable the same to roll and/or steer synchronously and in a specular manner for example through the interposition of articulated quadrilaterals.

As regards the steering angle of the front wheels, it is also possible to provide for different steering angles between the front wheels, for example if you take a car type steering, where the outer wheel remains more open when cornering.

Tilting three-wheeled motor vehicles are thus designed to provide the user with the handling of a two-wheel motorcycle and, at the same time, the stability and safety of a four-wheeled vehicle.

In fact the two predefined goals are antithetical since greater stability requires the presence of additional elements compared to a two-wheeled motor vehicle (such as the third wheel and its relative kinematic mechanisms) which inevitably weigh down the structure of the vehicle.

Moreover, the presence of 'only' three wheels cannot per force guarantee the stability and roadholding of a four-wheeled vehicle.

Therefore, it is essential to develop a three-wheeled vehicle that can mediate these antithetical objectives, while ensuring stability and handling, as well as reliability and low costs.

To achieve such purposes a specific geometry of the front portion of the frame or forecarriage must be developed, responsible for supporting the front wheels in their steering and rolling or tilting movement.

PRESENTATION OF THE INVENTION

To resolve the aforesaid problems, to date many solutions have been adopted in the art of three-wheeled vehicles, of which two on the forecarriage.

Such solutions of the prior art fail to optimise the need for stability and handling described above.

The need is therefore felt to resolve the drawbacks and limitations mentioned with reference to the prior art.

This requirement is satisfied by a motor vehicle forecarriage according to claim 1 and by a motor vehicle according to claim 34.

DESCRIPTION OF THE DRAWINGS

Further characteristics and advantages of the present invention will be more clearly comprehensible from the description given below of its preferred and non-limiting embodiments, wherein:

FIGS. 1-2 show side views, from different angles, of components of the forecarriage according to one embodiment of the present invention;

FIGS. 1-2 show side views, from different angles, of components of the forecarriage according to one embodiment of the present invention;

FIGS. 4a-2b show side views from different angles of components of the forecarriage in FIG. 3;

FIGS. 4c-4d show side views, from different angles, of components of the forecarriage according to one embodiment of the present invention;

FIGS. 6a-6b show side views from different angles of components of the forecarriage in FIG. 5;

FIGS. 6e, 6f, 6g show views from different angles of the components in FIGS. 6a-6d; in the configuration of compression of the spring;

FIG. 7 is a side view of a component guide wheel, according to the present invention;

FIG. 8 shows a cross-section view of the component in FIG. 7, along the cross-section plane VIII-VIII in FIG. 7;

FIG. 9 is a side view of the component, guide wheel, of FIG. 7, from a different angle;

FIG. 10 shows a cross-section view of the hub in FIG. 9, along the cross-section plane X-X in FIG. 9;

The elements or parts of elements Common to the embodiments described below will be indicated using the same reference numerals.

DETAILED DESCRIPTION

Figure 1:
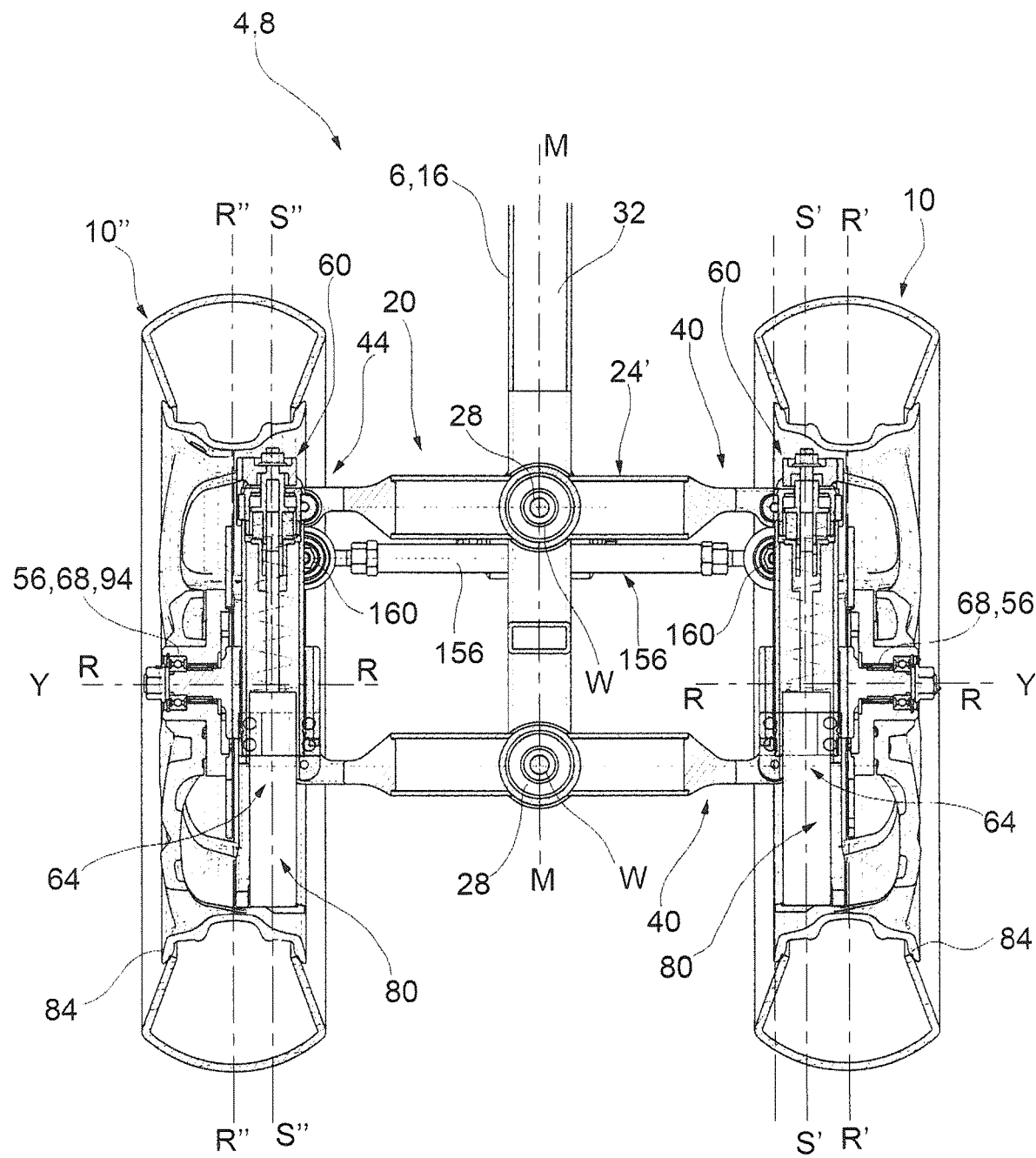
FIG. 1 shows a cross-section view of the forecarriage of a motor vehicle according to one embodiment of the present invention.
Figure 2B:
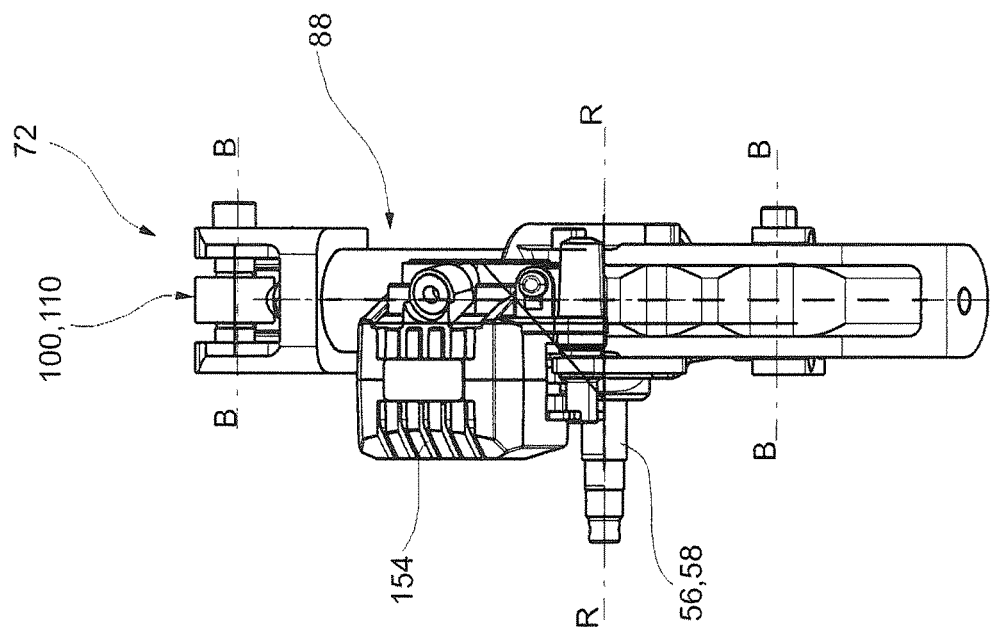
Figure 2A:
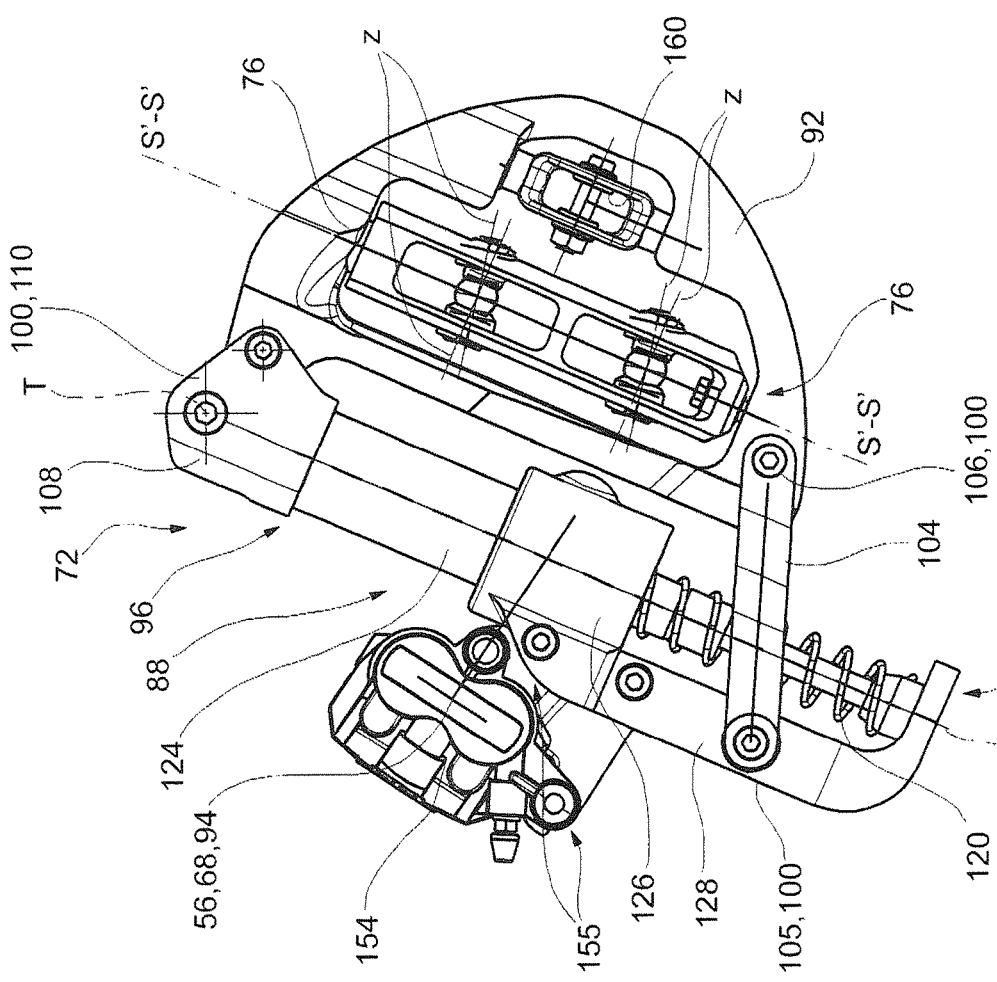
Figure 3:
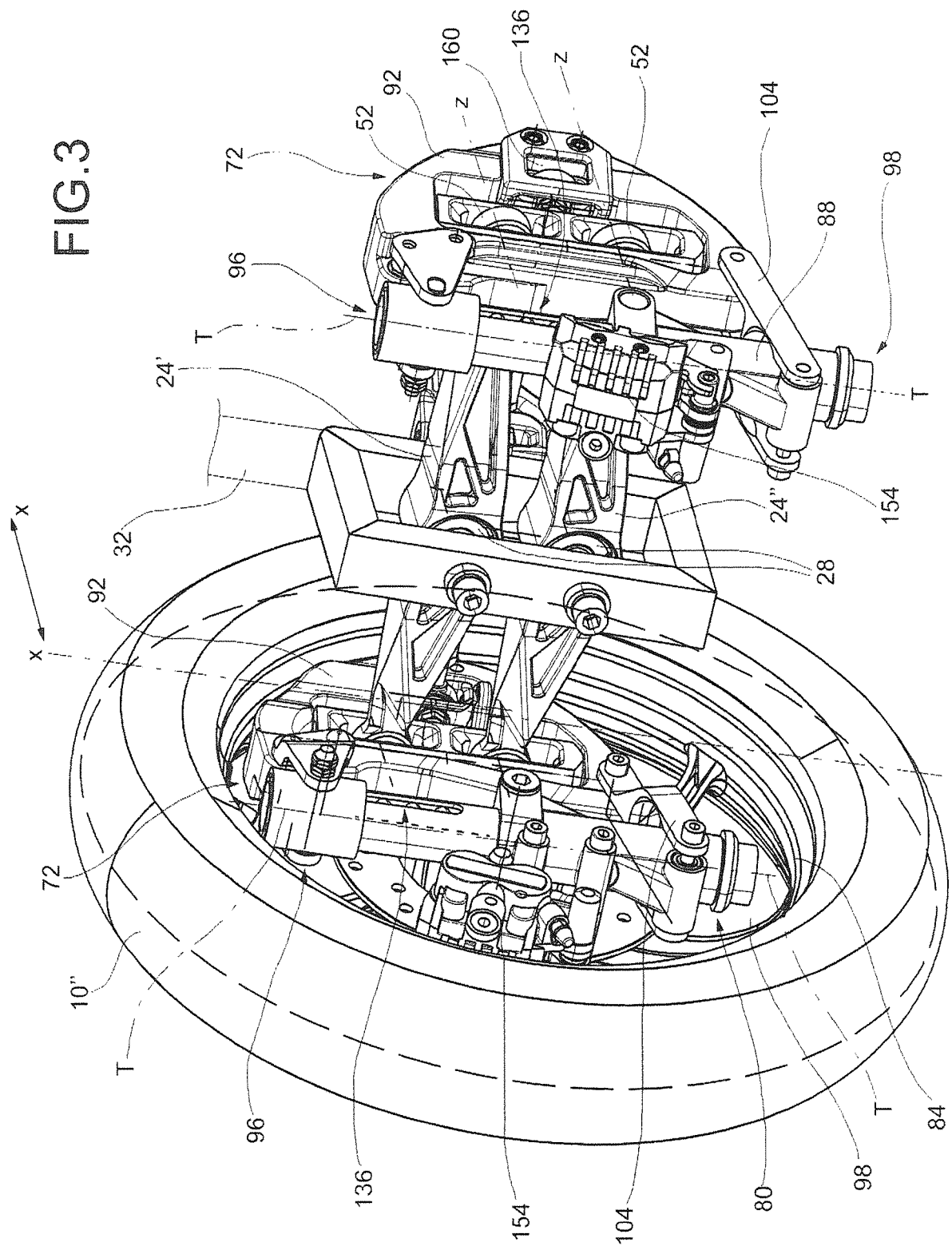
FIG. 3 shows a perspective view of a forecarriage of a motor cycle according to a further embodiment of the present invention.
Figure 5:
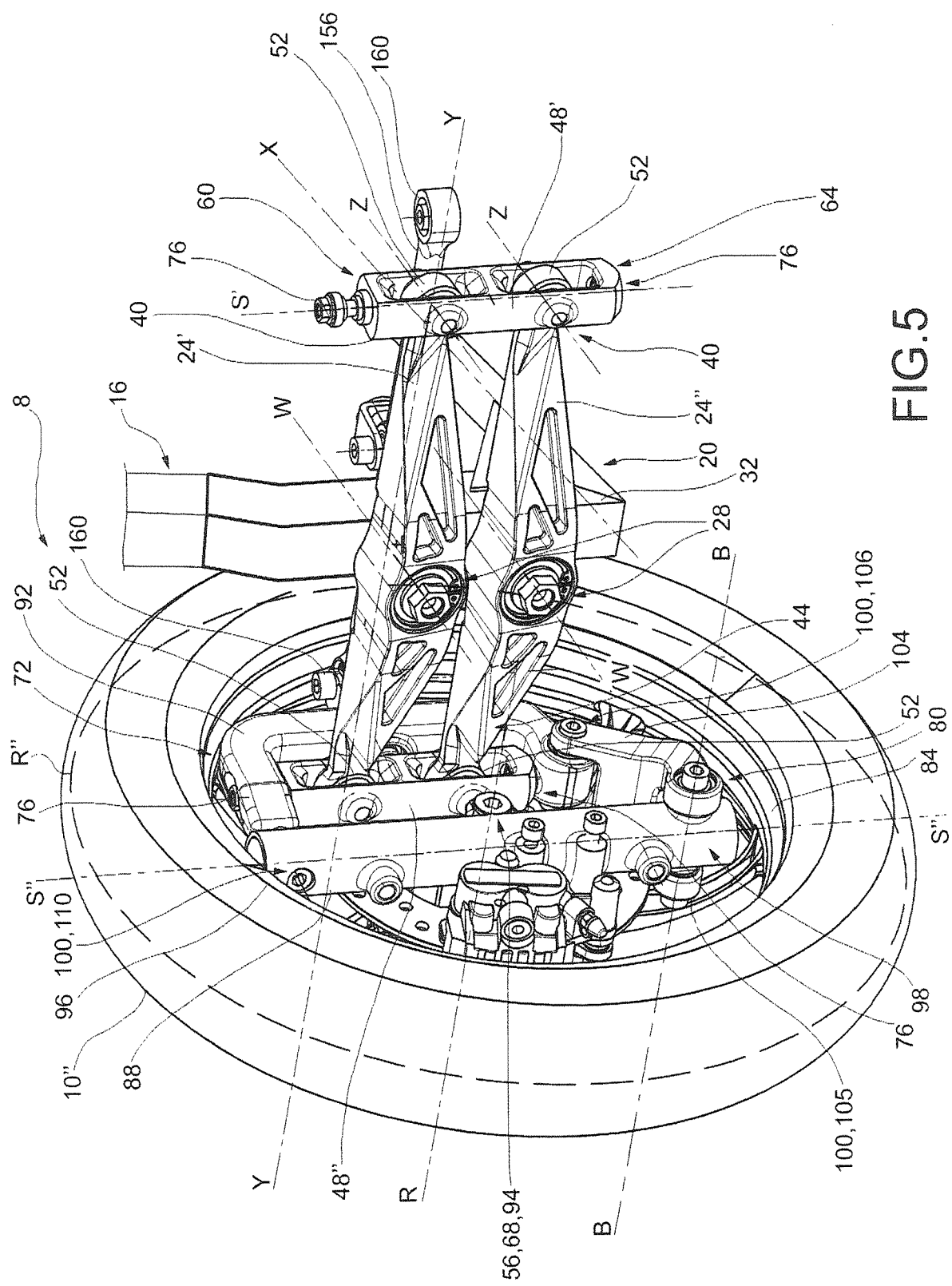
FIG. 5 is a perspective view of a forecarriage of a motor cycle according to a further embodiment of the present invention.
Figure 6D:
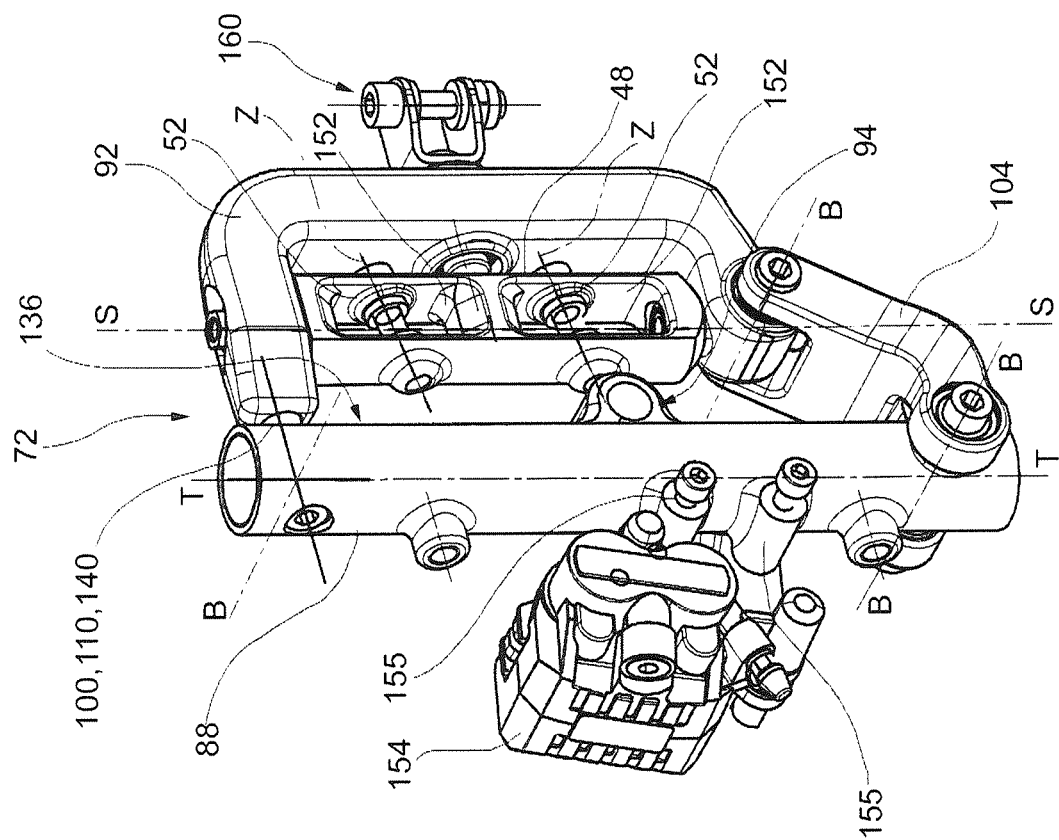
FIGS. 6c-6d show side views from different angles of components of the forecarriage in FIG. 5.
Figure 6C:
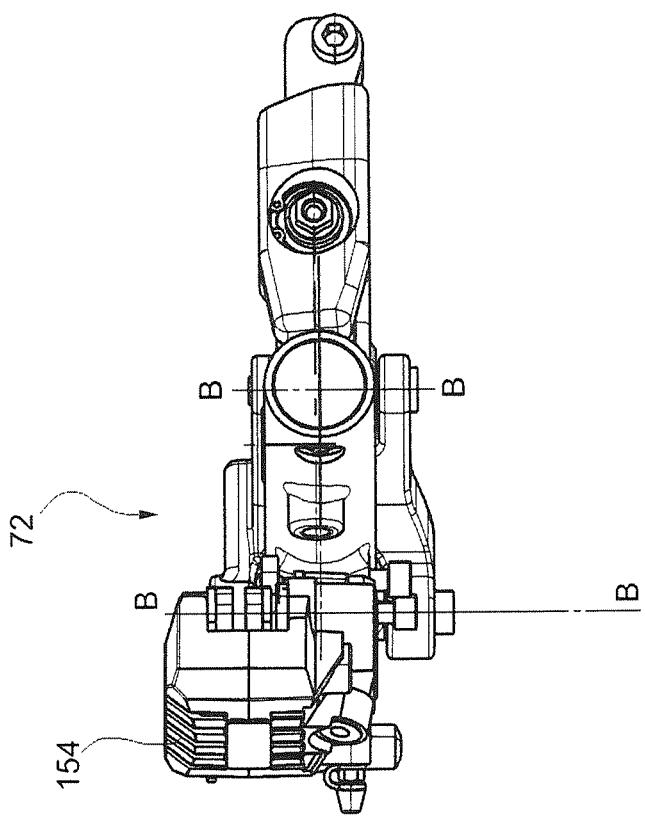
Figure 11:
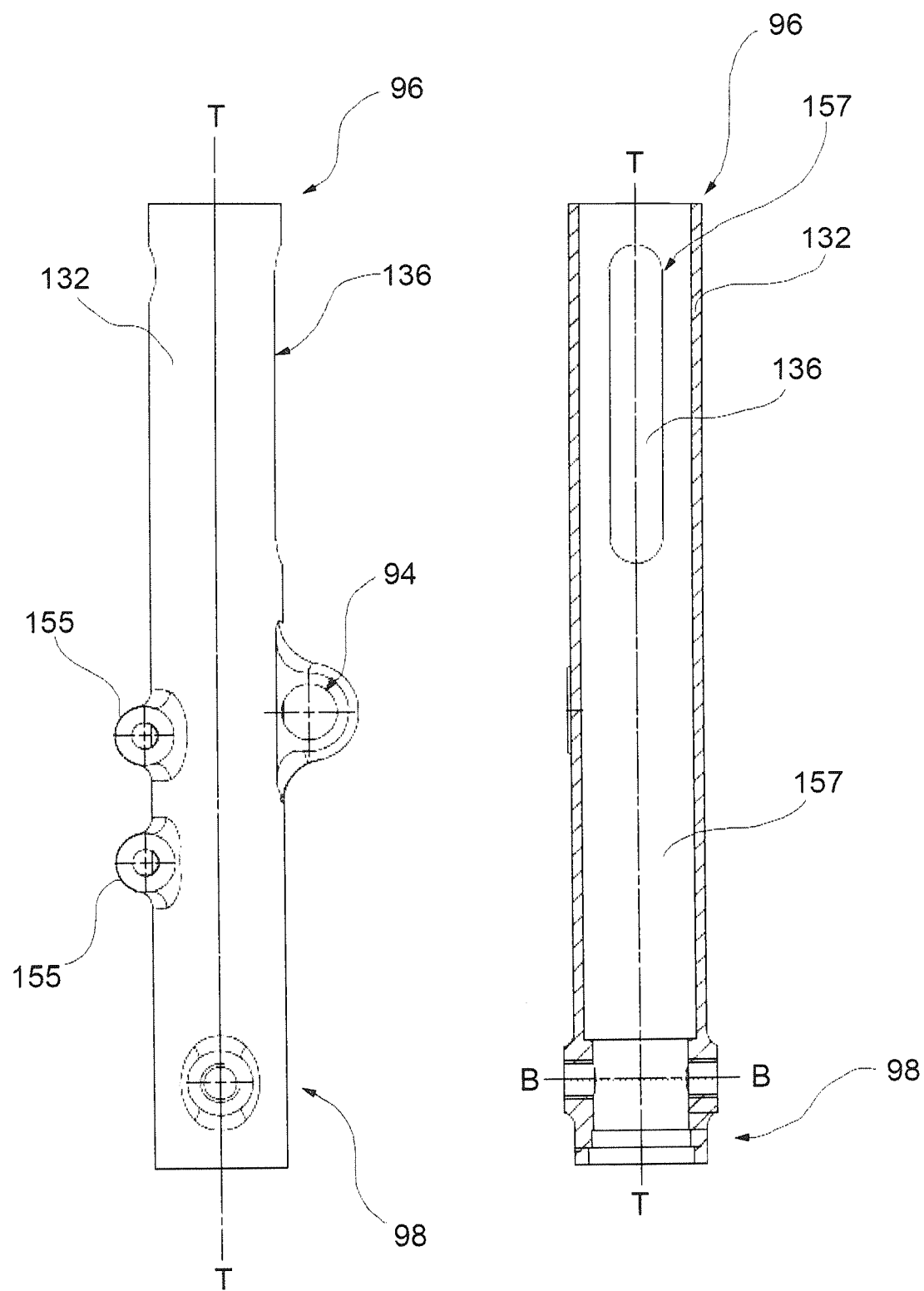
FIG. 11 shows a further side view, in cross-section, of a part of the guide wheel in FIG. 7.
Figure 12:
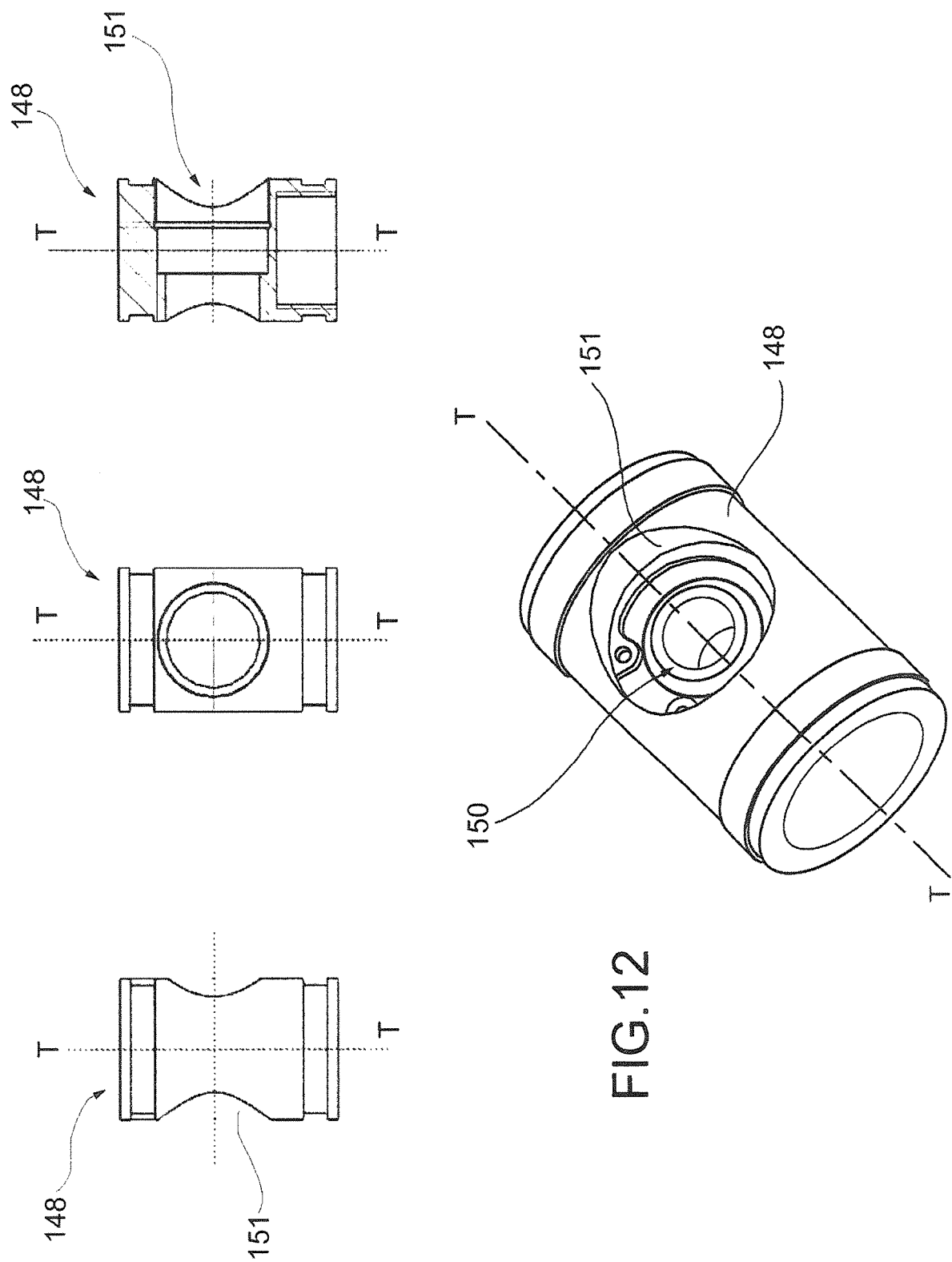
FIG. 12 shows various views of a further component of the guide wheel in FIG. 7.

With reference to the aforementioned figures, reference numeral 4 globally denotes a schematic overall view of a motor vehicle according to the present invention.

For the purposes of the present invention, it should be pointed out that the term motor vehicle should be considered in a broad sense, encompassing any motor cycle having at least three wheels, i.e. two aligned wheels, as described better below and at least one rear wheel. Such definition therefore also comprises so-called quad bikes having two wheels on the forecarriage and two wheels on the rear axle.

The motor vehicle 4 comprises a frame 6 extending from a forecarriage 8, supporting at least two front wheels 10, 10',10" to a rear axle supporting one or more rear wheels (not shown).

It is possible to distinguish a left front wheel 10' and a right front wheel 10" in which the definition of left and right 10', 10" is purely formal and means in relation to a driver of the vehicle. Said wheels are arranged to the left and right of the centreline plane M-M of the motor vehicle, compared to a point of observation of a driver driving it.

In the following description, and also in the drawings, reference will be made to symmetrical or specular elements of the forecarriage with respect to said centreline plane M-M using the quotes ' and " to indicate respectively the components to the left and right of the forecarriage, compared to a point of observation of a driver driving it.

For the purposes of the present invention, the frame 6 of the motor vehicle may be any shape, size and may for example be of the lattice type, box type, cradle, single or double, and so forth.

The frame 6 of the motor vehicle can be in one piece or in multiple parts; for example the frame 6 of the motor vehicle interconnects with a rear axle frame which may comprise an oscillating rear fork (not shown) which supports one or more rear drive wheels.

Said rear oscillating fork may be connected to the frame 6 by direct hinging, or by the interposition of a lever mechanism and/or intermediate frames.

The motor vehicle forecarriage 8 comprises a forecarriage frame 16 and a pair of front wheels 10 kinematically connected to the forecarriage frame 16 by means of an articulated quadrilateral 20.

The articulated quadrilateral 20 comprises a pair of cross members 24 hinged to the forecarriage frame 16 in correspondence of middle hinges 28.

The middle hinges 28 identify middle hinge axes W-W parallel to each other.

For example said middle hinges are fitted on a front beam 32, positioned to straddle, a centreline plane M-M passing through a longitudinal direction X-X or the direction of travel of the motor vehicle.

For example, a steering mechanism, connected to a handlebar (not shown) of the motor vehicle 4, is pivoted on a steering column inserted so as to swivel in a steering tube of the frame 6 of the motor vehicle 4, in the known manner.

The cross members 24 extend in a main transverse direction Y-Y between opposite transverse ends 40,44.

In particular, said cross members 24 are connected together, in correspondence of said opposite transverse ends 40, 44, by means of uprights 48, pivoted to said transverse ends 40, 44 in correspondence of side hinges 52.

In one embodiment the cross members 24, 24', 24" are mounted cantilevered with respect to the front beam 32.

The cross members 24 and the uprights 48 define said articulated quadrilateral 20. In particular the quadrilateral 20 comprises two cross members 24, i.e. a top cross member 24' and a bottom cross member 24", in which the top cross member 24' is facing the side of the associable handlebar and the bottom cross member 24" is facing towards the ground supporting the motor vehicle 4.

The cross members 24', 24" are not necessarily the same as each other in terms of shape, materials and size; each cross member 24 can be made in one piece or in two or more parts mechanically attached, for example by welding, bolts, rivets and similar.

There are two uprights 48, in particular a left upright 48' and a right upright 48".

The definition of left and right upright 48', 48" is purely formal and means in relation to a driver of the vehicle. Said left and right uprights 48', 48" are arranged to the left and right of a centreline plane M-M of the motor vehicle, compared to a point of observation of a driver driving it.

The side hinges 52 are parallel to each other and define respective side hinge axes Z-Z.

Preferably, said middle 28 and side hinges 52 are oriented according to middle W-W and side Z-Z hinge axes parallel to each other.

The left and right uprights 48', 48" rotatably support the left and right front wheels 10', 10", respectively, around respective steering axes S'-S', S"-S". Said steering axes S'-S',S"-S" are parallel to each other.

Each upright 48 extends from an upper end 60 to a lower end 64.

The top end 60 is facing towards the upper cross member 24' and the lower end 64 is facing the bottom cross member 24". Each front wheel comprises a stub axle 56 of a front wheel 10.

According to one embodiment, each stub axle 56 is mechanically connected to a rotation pin 68 of a front wheel 10 so as to rotatably support the front wheel 10 around a related rotation axis R-R.

Each rotation pin 68 of the front wheel 10 is comprised between the upper end 60 and the lower end 64 of the corresponding upright 48 of the articulated quadrilateral 20.

According to a possible embodiment, the hinges 28 and 52 are parallel to each other and perpendicular to said steering axes S'-S', S"-S". In other words, according to one embodiment, compared to a projection plane P passing through said middle hinges 28, the steering axes S'-S', S"-S" identify with the middle W-W and lateral hinge axes an angle α of 90 degrees.

According to possible embodiments, said angle α is between 80 and 120 degrees and preferably said angle α is between 90 and 110 degrees; even more preferably said angle α is equal to 100 degrees.

The steering axes S'-S', S"-S" with respect to said projection plane P, may be inclined by a steering angle β between 4 and 20 degrees, more preferably between 8 and 16 degrees with respect to a vertical direction N-N, perpendicular to the ground.

According to further embodiments, it is also possible to provide that the hinges 28 and 52 are tilted according to middle W-W and lateral hinge axes Z-Z side parallel to the ground, i.e. perpendicular to said vertical direction N-N with respect to said projection plane P: in this configuration, said angle β is equal to 0 degrees Furthermore, as seen, it is also possible to provide that the hinges 28 and 52 are not perpendicular to the steering axes S'-S', S"-S": in fact, as described above, said angle α, defined between the steering axes S'-S', S"-S' and the middle W-W and side hinges Z-Z with respect to a projection plane P passing through said middle hinges 28, is comprised between 80 and 120 degrees.

The parallelism to the ground of the middle W-W and side hinge axes Z-Z means that, in the rolling motion, the inner wheel with respect to the curve rises upwards almost vertically with the double advantage of uncoupling the rolling motion of the wheel from horizontal braking forces (transmitted from the ground) and of taking up less space towards the bottom of the motor vehicle.

It should be noted that, by tilting the middle W-W and side axes Z-Z with respect to the steering axes S'-S', S"-S", so that in static conditions at rest said middle W-W and side hinge axes Z-Z are parallel to the ground, in braking conditions, and therefore compression of the suspensions of the front wheels 10', 10", said middle W-W and side hinge axes Z-Z are inclined moving into a condition of substantial parallelism to the ground. For example, if in static conditions the middle W-W and side hinge axes Z-Z identify an angle β different from zero with the horizontal direction (which coincides with the angle formed with the vertical direction, which is perpendicular to the horizontal direction), in braking and maximum compression conditions this angle tends to zero.

When, during braking, the middle W-W and side hinge axes Z-Z are arranged substantially parallel to the ground, the jumping of the wheels is avoided since the braking forces, horizontal and therefore parallel to the ground, do not produce components along the excursion movement of the wheels which is practically perpendicular to the ground, i.e. vertical.

In addition, it should be noted that the upper 60 and lower 64 ends of the uprights 48', 48", are placed above and below the rotation pin 68 of the respective front wheels 10',10" and not completely over it, as occurs in the solutions of the prior art.

In other words, each rotation pin 68 of the front wheel 10', 10" is comprised between the upper end 60 and the lower end 64 of the corresponding upright 48, 48', 48" of the articulated quadrilateral 20.

This implies that the stiffness of the connection between each wheel 10',10" and the articulated quadrilateral, comprising the suspension, is a more rigid order of magnitude than happens in the aforementioned solutions of the prior art, helping to make the possibility more remote that an alternating resonance of the front wheels 10', 10" may take overdue to braking forces or an asymmetric impact. Consequently the present invention helps overall to provide a vehicle that is lightweight but also safe, precise and that conveys to the driver a feeling of safety at the forecarriage, in that it does not transmit to the user vibrations or flickering on the handlebar.

Furthermore, the positioning of the upper and lower 24', 24" cross members of the articulated quadrilateral in the vertical dimension of the wheels makes it possible to move the barycentre of the forecarriage, and therefore of the vehicle, downwards, improving the dynamic behaviour of the vehicle.

Advantageously the forecarriage 8 comprises, in correspondence of each front wheel 10', 10", a tilting support structure 72 for the stub axle 56 of each front wheel 10', 10" mechanically connected to a rotation pin 68 of a front wheel 10', 10" so as to rotatably support the front wheel 10', 10"' around a related rotation axis R-R.

Advantageously, said tilting support structure 72 is hinged to the articulated quadrilateral 20 by means of steering hinges 76 arranged in correspondence of the upper ends 60 and lower ends 64 of each upright 48', 48", said steering hinges defining respective steering axes S'-S', S"-S" of the wheels 10', 10" parallel to each other.

Preferably, the steering axes S'-S', S"-S" coincide with axes of symmetry of said uprights 48',48" respectively.

Each wheel 10',10" comprises a centreline plane of the wheel R'-R', R"-R", wherein said centreline plane of the wheel R'-R',R"-R" passes through the steering axis S'-S', S"-S" of each front wheel 10',10". In a further embodiment, an offset or transverse overhang is provided between each steering axle S'-S',S"-S" and the relative centreline plane of the wheel R'-R', R"-R". Such transverse overhang is between 0 and 2 cm, more preferably between 0 and 1 cm, even more preferably said transverse overhang is equal to 0.7 cm.

Preferably said tilting support structure 72 is entirely contained within a volume 80 delimited by a rim 84 of each wheel 10', 10".

Preferably, said volume 80 is facing with respect to a centreline plane M-M of the forecarriage 8 passing through said middle hinges 28. In other words, the stub axles 56 are facing inward towards the centreline plane M-M of the motor vehicle and the relative components associated with the stub axles 56 spindles are not directly visible to an outside observer.

According to a preferred embodiment, said tilting support structure 72 comprises a guide wheel 88 connected to said stub axle 56 of front wheel 10', 10", a support bracket 92 hinged to the articulated quadrilateral 20 by means of said steering hinges 76.

The guide wheel 88 is connected to the rotation pin 68 and rotatably supports said rotation pin 68 of the corresponding wheel 10', 10" in correspondence with a special wheel attachment 94.

The guide wheel 88 extends between opposite upper and lower axial ends 96, 98; preferably, at said opposite axial ends 96, 98, the guide wheel 88 is mechanically connected to connection elements to the frame.

For example, the guide wheel 88 is in turn hinged to the support bracket 92 at opposite upper and lower axial ends 96,98 of the guide wheel 88, by at least three tilting hinges 100 which define respective tilting axes B-B and which realise a roto-translational connection between the guide wheel 88 and the support bracket 92.

Preferably, the guide wheel 88, the support bracket 92 and tilting hinges 100 define a peripherally closed tilting structure support 72.

The term peripherally closed structure is understood to mean that the projections of the guide wheel 88, support bracket 92 and tilting hinges 100 on the centreline plane of the wheel R'-R', R"-R" define a closed polyline, or have a closed perimeter.

Preferably the rotation pin 68 of each wheel 10', 10" is positioned inside said peripherally closed tilting support structure 72 and/or the side hinges 52 and the respective upright 48 are positioned inside said peripherally closed tilting support structure 72.

According to one embodiment, the tilting support structure 72 comprises a connecting rod 104 doubly hinged to the support bracket 92 and to the guide wheel 88 at a first and a second tilting hinge 105,106.

According to one embodiment, the tilting support structure 72 comprises a plate 108 hinged to the support bracket 92 and to the guide wheel 88 at a third tilting hinge 110.

The tilting hinges 100,105,106,110 are hinged to the support bracket 92 and to the guide wheel 88 at tilting axes B-B perpendicular to a centreline plane R'-R', R"-R" of each wheel 10', 10" and perpendicular to the steering axes S'-S', S"-S" defined by said steering hinges 76.

Preferably, said guide wheel 88 is a rectilinear guide which comprises a damper 116 and a spring 120 to realise a suspension for each wheel 10', 10". Such straight guide wheel 88 defines a shaking axis T-T for each wheel 10', 10".

According to one embodiment, the guide wheel 88 comprises a stem 124, which houses the damper 116, and a case 126, fitted coaxially to the stem 124, and translatable with respect to the stem 124, the case 126 supporting the stub axle 56 of the corresponding wheel 10',10" and being elastically influenced by the spring 120.

For example, the case 126 comprises a support and fixing appendix 128 of the spring 120 and of one of said tilting hinges 100, 105, 106, 110.

According to one embodiment, the guide wheel 88 comprises an outer jacket 132 on which are connected the stub axle 56 and a connecting rod 104 doubly hinged to the support bracket 92 and to said outer jacket 132 of the guide wheel 88 in correspondence of a first and of a second tilting hinge 105, 106. Moreover, said outer jacket 132 internally encloses a damper 116 and a spring 120, the outer jacket 132 comprising a slot 136 that houses a pin 140 axially guided by said slot 136, the pin 140 defining a third tilting hinge 110 and being connected to the support bracket 92 by a connecting rod 104 or a plate 108.

The pin 140 is elastically influenced by the spring 120 so as to guide an extension or compression movement of the spring 120 through said slot 136.

For example, between the outer jacket 13 and the connecting rod 104 or plate 108 is interposed a collar 144 fitted coaxially to the outer jacket 132 so to realise an outer guide to the movement of the pin 140 along the slot 136.

The slot 136 is directed parallel to a main extension of the guide wheel 88 and, in particular, the slot 136 is directed along a plane perpendicular to said centreline plane R'-R', R"-R" of each wheel 10', 10".

According to a further embodiment of the present invention, the guide wheel 88 comprises an outer jacket 132 on which are connected the stub axle 56 and a connecting rod 104 doubly hinged to the support bracket 92 and said outer jacket 132 of the guide wheel 88 in correspondence of a first and of a second tilting hinge 105, 106, and said outer jacket 132 internally encloses the damper 116 and the spring 120, the outer jacket 132 comprising a slot 136 that houses a pin 140 axially guided by said slot 136. The pin 140 is in turn hinged to a slider or sliding bushing 148 housed inside the outer jacket 132 and defining the third tilting hinge 110.

For example, the pin 140 is hinged to said slider or sliding bushing 148 at a hinge or ball joint 150.

Said hinge or ball joint 150 defines the third tilting hinge 100, 110.

For example the pin 140 is inserted in the guide wheel 88 through the slot 136 and, on the side opposite to said slot 136, the pin 140 is fixed to the slider or sliding bushing 148 by a head 153 housed in a cavity 157 of the guide wheel 88, so as to slide with respect to the guide wheel 88, parallel to said shaking direction T-T, without interfering with the guide wheel 88, and without having to cross the outer jacket through a second slot diametrically opposite the slot 136.

Preferably, the slider or sliding bushing 148 comprises at least one countersink 151 suitable to allow a related inclination of the cursor or sliding bushing 148 with respect to the pin 140 during the shaking movement of the wheel 10', 10" along said shaking axis T-T defined by the guide wheel 88.

Such related inclination, permitted by the countersink 151, prevents bumps or interference between the pin 140, the slider or sliding bushing 148 and the outer jacket 132 of the guide wheel 88.

The pin 140 is preferably fixed relative to said support bracket 92.

In such embodiment, said slot 136 is directed parallel to a main extension of the guide wheel 88 and, in particular, the slot 136 is directed parallel to a centreline plane R'-R', R"-R" of each wheel 10', 10".

It should be noted that the guide wheel 88 constitutes a sort of hybrid construction between a normal shock absorber and a stem of a fork for motorcycles. The special construction makes it possible to combine the flexural strength of a fork lining, from which it can also inherit the caliper, connecting rod and wheel pin linkage with great compactness. This compactness is achieved thanks to the presence of the slot 136.

In fact if there were no slot 136 the point of attachment, corresponding to the upper axial end 96 which remains fixed during compression would need to be significantly higher since the section corresponding to the stroke must insert itself in the relative lining.

In addition, it should be noted that the spring 120 works in air and not in oil as with a conventional fork, and thus the slot 136 can be opened without fear, just as the slider or sliding bushing 148 is not a seal, as happens between the stem and the lining of a conventional fork, but is a simple ring, for example in plastic, which works exposed to the weather, to the advantage of the simplicity and economy of the solution.

Preferably the transverse ends 40,44 of the upper and lower cross members 24',24" of the articulated quadrilateral 20 are at least partially housed inside transversal seats 152 made inside said uprights 48', 48".

Preferably, to each guide wheel 88 braking means 154 of the corresponding wheel 10', 10" are attached.

For example, said braking means 154 may comprise a disc brake caliper. For the purposes of the present invention, the braking means 154 may be of any type; preferably, said braking means 154 are positioned and sized to fit inside the volume 80 defined by the rim 84 of each wheel 10', 10".

Preferably, said guide wheel 88 comprises dedicated eyelets 155, made for example on the lining 126 or on the outer jacket 132, to allow the attachment of the braking means 154 to the guide wheel 88.

In addition, on said lining 126 or outer jacket 132 of the guide wheel 88 said wheel attachment 94 is made to rotatably support the rotation pin 68 of each wheel 10.

Preferably, to said support bracket 92 are fixed steering tie rods 156 kinematically connected to an associable handlebar of the motor vehicle. For example the steering tie rods 156 can be connected to each bracket 92 through the interposition of hinges or ball joints 160.

As mentioned above, the motor vehicle 4 according to the present invention comprises at least one rear drive wheel 14; according to a possible embodiment, the vehicle has two rear drive wheels 14 at the rear axle 12.

For example, in such embodiment, in which the motor vehicle is a quadricycle, the rear drive wheels 14 at the rear axle 12 are connected to each other and to a rear axle frame 13 by means of an articulated quadrilateral 20 as described above in relation to the front wheels 10.

As may be appreciated from the description, the present invention makes it possible to overcome the drawbacks mentioned of the prior art.

Advantageously, the present invention improves the dynamic behaviour of the vehicle compared to the prior art.

In fact, the particular arrangement and architecture of the support of the front wheels makes it possible to move the centre of instantaneous rotation of the front wheels considerably rearwards relative to the longitudinal direction.

This gives a better control of the sinking of the suspension, comparable to that obtained using a conventional type telescopic stem fork. In other words, the sinking of the suspension is uniform and progressive and the forecarriage of the vehicle transmits to the driver a feeling of stability and confidence.

In addition, the tilting type assembly of the support structure of the front wheels prevents said suspension, comprising spring and damper housed in the guide wheel, from being stressed to bend: this facilitates the relative sliding between the stem and the lining of the suspension and prevents jamming phenomena. It is thus possible to avoid oversizing the suspension to make up for such bending and jamming of the suspension since, thanks to the tilting, the suspension can follow the shaking movement of the wheel with respect to the frame, tilting without flexing and therefore without jamming.

This effect is even more evident in the case of braking as the considerable forces involved do not tend again to flex the suspension, which can tilt, extending and compressing itself freely, so as to copy the roughness of the asphalt and transmit to the driver a feeling of security and confidence in the forecarriage.

A smaller and lighter suspension can be used since it does not have to withstand bending loads.

The reduced dimensions of the components of the suspension also entail a reduction of the masses of the forecarriage and therefore better handling of the tilting vehicle and improved propensity to lower when leaning.

Also, as seen, the steering axis of the wheels is significantly further back in the longitudinal direction compared to the rotation pin thereof.

This way there is a smaller footprint of the back of the wheels towards the centreline plane of the vehicle, while steering. This way, for the same steering angle of the wheels, it is possible to use a relatively small wheel track, or transverse distance between the front wheels, without the respective rear portions of the front wheels interfering with the forecarriage frame of the vehicle.

Thus it is possible to use contained wheel tracks so as to reduce the overall transversal footprint of the vehicle. The use of reduced front wheel tracks helps to obtain an agile vehicle with an excellent propensity for leaning or tilting.

In addition, it is possible to move the steering linkage further back from the forecarriage and therefore protected. In addition, said steering linkage can also be obscured to an outside observer because positioned further back and out of sight.

In addition, thanks to the longitudinal movement backwards of the steering axle and relative mechanisms/steering levers it is also possible to move the forecarriage masses further back so as to contribute to the so-called centralisation of the masses, in order to improve the dynamics of the vehicle both when cornering and accelerating/braking.

In addition, it should be noted that the suspended masses of the forecarriage according to the invention are reduced in order to improve the capacity of the forecarriage to accommodate the roughness in the road.

In addition, it should be noted that the support structure of the front wheels is extremely rigid both in a longitudinal and transverse direction.

In fact, in the transverse direction an articulated quadrilateral structure is provided which proves decidedly sturdy and which allows the wheels to lean or tilt again with the same angle.

In the longitudinal direction it is to be noted that an extremely rigid tilting structure is used since it includes a bracket which, on the one hand is constrained to the guide wheel by appropriate tilting, and on the other is in turn constrained to the rigid structure of the said transverse quadrilateral. This way, the longitudinal forces, thanks to the tilting of the structure, are offloaded onto the rigid structure of the bracket and, through this, onto the articulated quadrilateral.

In addition, the forecarriage of the present invention is particularly compact, so much so that advantageously, all the support mechanisms, suspension and steering of each wheel are contained within the footprint of the rim of said wheel. This way, besides the obvious aesthetic benefits, dynamic advantages are also obtained, since it has a reduced aerodynamic drag caused by such components which are shielded inside each wheel.

The described solution falls within the case of interconnected suspensions since the balance to a load on a front wheel is found with an equal load on the conjugated front wheel; the load transfer occurs through the quadrilateral, and thus by means of its inertia which also involves that of the entire vehicle, and thus presents a delay of an entity related to said inertia.

In practice, the inertia interposed between the paired wheels acts so as to move the solution with interconnected wheels towards one with independent wheels favouring comfort and counteracting any resonance phenomena that could be triggered on the wheels, which would otherwise not be damped.

Therefore the motor vehicle according to the present invention is able to guarantee not only high stability, superior to that of a motor vehicle with two wheels, thanks to the presence of two paired front wheels, but also remarkable handling and ease of leaning, typical of a motor vehicle with only two wheels.

In addition, as described above the upper and lower ends of the uprights of the articulated quadrilateral are placed above and below the rotation pin of the respective front wheels and not completely over it, as occurs in the solutions of the prior art. This implies that the stiffness of the connection between each wheel and the articulated quadrilateral, comprising the suspension, is a more rigid order of magnitude than happens in the aforementioned solutions of the prior art, helping to make the possibility more remote that an alternating resonance of the front wheels may take overdue to braking forces or an asymmetric impact. Consequently the present invention helps overall to provide a vehicle that is lightweight but also safe, precise and that conveys to the driver a feeling of safety at the forecarriage, in that it does not transmit to the user vibrations or flickering on the handlebar.

A person skilled in the art may make numerous modifications and variations to the solutions described above so as to satisfy contingent and specific requirements while remaining within the sphere of protection of the invention as defined by the following claims.

The invention claimed is:

1. Motor vehicle forecarriage comprising
    a forecarriage frame,
    a pair of front wheels kinematically connected to the forecarriage frame by means of an articulated quadrilateral, said articulated quadrilateral comprising a pair of cross members, hinged to the forecarriage frame in correspondence of middle hinges, said cross members being connected to each other, in correspondence of opposite transverse ends, by means of uprights pivoted to said transverse ends in correspondence of side hinges, each upright extending from an upper end and a lower end, the upper end being turned towards the upper cross member and the lower end being turned towards the lower cross member, the cross members and the uprights defining said articulated quadrilateral, wherein the forecarriage comprises, in correspondence of each front wheel, a tilting support structure for a stub axle of each front wheel mechanically connected to a rotation pin of a front wheel so as to rotatably support the front wheel around a related rotation axis, said tilting support structure being hinged to the articulated quadrilateral by means of steering hinges arranged in correspondence of the upper ends and lower ends of each upright, said steering hinges defining respective steering axes of the wheels parallel to each other.

2. Motor vehicle forecarriage according to claim 1, wherein said steering axes coincide, respectively, with axes of symmetry of said uprights.

3. Motor vehicle forecarriage according to claim 1 or 2, wherein each wheel comprises a wheel centreline plane, in which each wheel centreline plane passes, respectively, through the steering axis of each front wheel.

4. Motor vehicle forecarriage according to claim 1, wherein said tilting support structure is entirely contained within a volume delimited by a rim of each wheel.

5. Motor vehicle forecarriage according to claim 4, wherein said volume is facing with respect to a centreline plane of the forecarriage passing through said middle hinges.

6. Motor vehicle forecarriage according to claim 1, wherein said tilting support structure comprises
   a guide wheel connected to said rotation pin of front wheel in correspondence of a special wheel attachment,
   a support bracket hinged to the articulated quadrilateral by means of said steering hinges,
   the guide wheel being in turn hinged to the support bracket in correspondence of opposite upper and lower axial ends, by means of at least three tilting hinges that define respective tilting axes and that realise a rototranslational connection between the guide wheel and the support bracket.

7. Motor vehicle forecarriage according to claim 6, wherein the guide wheel, the support bracket and the tilting hinges delimit a peripherally closed tilting support structure.

8. Motor vehicle forecarriage according to claim 7, wherein the rotation pin of each wheel is positioned inside said perimetrically closed tilting support structure, and/or the side hinges and the respective upright are positioned inside said perimetrically closed tilting support structure.

9. Motor vehicle forecarriage according to claim 6, wherein the tilting support structure comprises a connecting rod doubly hinged to the support bracket and the guide wheel in correspondence with a first and a second tilting hinge.

10. Motor vehicle forecarriage according to claim 6, wherein the tilting support structure comprises a plate hinged to the support bracket and the guide wheel in correspondence of a third tilting hinge.

11. Motor vehicle forecarriage according to claim 6, wherein said tilting hinges are hinged to the support bracket and the guide wheel in correspondence of the tilting axes perpendicular to a centreline plane of each wheel and perpendicular to the steering axes defined by said steering hinges.

12. Motor vehicle forecarriage according to claim 6, wherein said guide wheel is a rectilinear guide that includes a damper and a spring to realise a suspension for said wheel.

13. Motor vehicle forecarriage according to claim 6, wherein the guide wheel comprises a stem, which houses the damper, and a case, fitted coaxially to the stem, and translatable with respect to the stem, the case supporting the wheel stub axle and being elastically influenced by the spring.

14. Motor vehicle forecarriage according to claim 13, wherein the case comprises a support and fixing appendix of the spring and one of said tilting hinges.

15. Motor vehicle forecarriage according to claim 6, wherein the guide wheel comprises an outer jacket on which are connected the stub axle and a connecting rod doubly hinged to the support bracket and said outer jacket of the guide wheel in correspondence of a first and of a second tilting hinge, and wherein said outer jacket internally encloses a damper and a spring, the outer jacket comprising a slot that houses a pin axially guided by said slot the pin defining a third tilting hinge and being connected to the support bracket by means of a connecting rod or a plate.

16. Motor vehicle forecarriage according to claim 15, wherein the pin is elastically influenced by the spring so as to guide an extension or compression movement of the spring through said slot.

17. Motor vehicle forecarriage according to claim 15, wherein between the outer jacket and the connecting rod or plate is interposed a collar fitted coaxially to the outer jacket so to realise an external guide the movement of the pin along the slot.

18. Motor vehicle forecarriage according to claim 15, wherein the slot is directed parallel to a prevalent extension of the guide wheel and the slot is directed along a plane perpendicular to said centreline plane of each wheel.

19. Motor vehicle forecarriage according to claim 6, wherein the guide wheel comprises an outer jacket on which are connected the stub axle and a connecting rod doubly hinged to the support bracket and said outer jacket of the guide wheel in correspondence of a first and of a second tilting hinge, and wherein said outer jacket internally encloses a damper and the spring, the outer jacket comprising a slot that houses a pin axially guided by said slot, the pin being hinged to a slider or sliding bushing house inside the outer jacket and defining a third tilting hinge.

20. Motor vehicle forecarriage according to claim 19, wherein the pin is fixed with respect to said support bracket.

21. Motor vehicle forecarriage according to claim 19, wherein the slot is directed parallel to a prevalent extension of the guide wheel and the slot is directed parallel to a centreline plane of the wheel.

22. Motor vehicle forecarriage according to claim 19, wherein the pin is hinged to said slider or sliding bushing in correspondence of a hinge or ball joint, said hinge or ball joint defining a tilting hinge of said tilting support structure.

23. Motor vehicle forecarriage according to claim 19, wherein the pin 44 is inserted in the guide wheel through the slot and, on the side opposite to said slot, the pin is fixed to the slider or sliding bushing by a head housed in a cavity of the guide wheel, so as to slide with respect to the guide wheel, parallel to a shaking direction, without interfering with the guide wheel.

24. Motor vehicle forecarriage according to claim 19, wherein the slider or sliding bushing comprises at least one countersink suitable to allow a related inclination of the cursor or sliding bushing with respect to the pin during the shaking movement of the wheel along a shaking axis defined by the guide wheel.

25. Motor vehicle forecarriage according to claim 1, wherein each rotation pin of the front wheel is comprised between the upper end and the lower end of the corresponding upright of the articulated quadrilateral.

26. Motor vehicle forecarriage according to claim 1, wherein the transverse ends of the upper and lower cross members are at least partially housed in transversal seats formed in said uprights.

27. Motor vehicle forecarriage according to claim 1, wherein to each guide wheel are fixed braking means of the corresponding wheel.

28. Motor vehicle forecarriage according to claim 1, wherein to said support bracket are fixed braking means kinematically connected to an associable handlebar of the motor vehicle.

29. Motor vehicle forecarriage according to claim 1, wherein the middle and side hinges are parallel to each other and are oriented so that, with respect to a projection plane passing through said middle hinges, the steering axes identify, with the axes of the middle hinge and side hinge, an angle, said angle $\alpha$ being between 80 and 120 degrees.

30. Motor vehicle forecarriage according to claim 1, wherein the hinges are parallel to each other and orthogonal to said steering axes so that, with respect to a projection plane passing through said middle hinges the steering axes identify with the axes of the middle hinge and side hinge, an angle of 90 degrees.

31. Motor vehicle forecarriage according to claim 1, wherein the steering axes, with respect to a projection plane passing through said middle hinges, are inclined by a steering angle between 4 and 20 degrees with respect to a vertical direction, perpendicular to the ground.

32. Motor vehicle forecarriage according to claim 1, wherein the middle and side hinges are inclined according to the axes of the middle hinge and side hinge parallel to the ground, i.e., perpendicular to a vertical direction perpendicular to the ground.

33. Motor vehicle forecarriage according to claim 1, wherein said middle hinges and side hinges are oriented according to the axes of the middle hinge and side hinge parallel to each other.

* * * * *